US005211436A

United States Patent [19]

Feder

[11] Patent Number: 5,211,436

[45] Date of Patent: May 18, 1993

[54] HANDLE DEVICE FOR USE ON TRUNK LIDS OF AUTOMOBILES

[76] Inventor: Emil Feder, Hannoversche Strasse 12, D-3501 Niestetal-Sandershausen, Fed. Rep. of Germany

[21] Appl. No.: 517,490

[22] Filed: Apr. 30, 1990

Related U.S. Application Data

[63] Continuation of Ser. No. 395,137, Aug. 16, 1989, abandoned, which is a continuation of Ser. No. 292,648, Dec. 29, 1988, abandoned, which is a continuation of Ser. No. 183,357, Apr. 12, 1988, abandoned, which is a continuation of Ser. No. 900,876, Aug. 27, 1986, abandoned.

[30] Foreign Application Priority Data

Aug. 27, 1985 [DE] Fed. Rep. of Germany ....... 3530483

[51] Int. Cl.[5] .......................................... B62D 25/10

[52] U.S. Cl. .................................. 296/76; 296/106; 296/146 E; 292/336.3; 292/DIG. 23; 292/DIG. 30; 292/DIG. 31; 70/208

[58] Field of Search .................. 296/56, 76, 106, 146, 296/152; 16/115; 70/208; 292/336.3, DIG. 23, DIG. 30, DIG. 31

[56] References Cited

U.S. PATENT DOCUMENTS

| | | | |
|---|---|---|---|
| 337,412 | 3/1886 | Long | 16/115 |
| 2,722,445 | 11/1955 | Cudney | 292/DIG. 31 |
| 3,052,493 | 9/1962 | Hawver et al. | 296/106 X |
| 3,858,921 | 1/1975 | Kuki | 292/336.3 |
| 3,967,844 | 7/1976 | Torii et al. | 292/336.3 |
| 4,412,696 | 11/1983 | Ishii et al. | 292/336.3 |
| 4,478,445 | 10/1984 | Shimizu | 292/336.3 |
| 4,588,219 | 5/1986 | Kobayashi et al. | 292/DIG. 31 |
| 4,591,196 | 5/1986 | Kurita | 292/336.3 |

FOREIGN PATENT DOCUMENTS

| | | | |
|---|---|---|---|
| 72537 | 2/1983 | European Pat. Off. | 16/115 |
| 3311111 | 10/1984 | Fed. Rep. of Germany . | |
| 1341562 | 12/1973 | United Kingdom | 292/336.3 |
| 2141976 | 1/1985 | United Kingdom | 296/146 |

*Primary Examiner*—Dennis H. Pedder

*Attorney, Agent, or Firm*—Flynn, Thiel, Boutell & Tanis

[57] ABSTRACT

A handle device for use in imparting a movement to an automobile door about a hinge axis for the purpose of opening and closing the door without causing the user's hand to become dirty. The handle device includes a handle part and a support structure for pivotally supporting the handle for movement about an axis that is parallel to the hinge axis. The movement of the handle part is between a position wherein the handle part is exposed and a further position wherein the handle is received wholly within an opening in the door. Surface structure is provided on the door and surface structure is provided on an end plate on the handle which engage to prevent admittance of dirt and the like into the opening in the door. When the handle part is moved to the exposed position, the end plate will become spaced from the opening outwardly from the outwardly facing surface of the door to allow access to a clean handle part to facilitate an opening and a closing of the door by enabling clean parts of the handle to be gripped to impart the opening and closing movements of the door about the hinge axis.

7 Claims, 2 Drawing Sheets

HANDLE DEVICE FOR USE ON TRUNK LIDS OF AUTOMOBILES

This application is a continuation of U.S. Ser. No. 07/395,137, filed Aug. 16, 1989 (now abandoned); which is a continuation of U.S. Ser. No. 07/292,648, filed Dec. 29, 1988 (now abandoned); which is a continuation of U.S. Ser. No. 07/183,357, filed Apr. 12, 1988 (now abandoned); which is a continuation of U.S. Ser. No. 06/900,876, filed Aug. 27, 1986 (now abandoned).

FIELD OF THE INVENTION

The invention relates to a device for moving automobile doors.

BACKGROUND OF THE INVENTION

The operating handles needed for opening and closing of automobile doors are mounted, accessible from outside, on the parts of the body of the automobile and are thus substantially exposed to weather influences and in particular to street dirt. This is particularly true for the operating handles used for operating the tail gate or trunk lid pivotal about a horizontal axis, since here in particular dirt appears due to the vortexes forming at the rear end of the vehicle.

A device for opening and closing of automobile doors has already become known from German OS No. 33 11 111, which is constructed such that the air resistance in the area of the operating handle and the occurring dirt are reduced. This known arrangement consists in the actual door handle being countersunk in a handle recess formed in the body of the automobile, so that the handle in its rest position lies with its outer contour flush with the outer contour of the automobile body. For opening of the door, the door handle is swung out of its handle recess about a vertical axis substantially flush with the automobile body on the one side into a ready position and can then be gripped at the swung-out backside, so that the door can in this manner be pulled open. To better guide the actual handle, support legs are provided which extend through the handle recess to the backside of the automobile body. To close the door, however, this known arrangement requires gripping the outside of the operating handle, so that the here dirty handle comes then into contact with the operating hand. The door handle which lies countersunk in a handle recess swings in the known arrangement about a vertical axis open to the outside. The upper and lower edge of the door handle is, even if it lies in a handle recess, exposed to dirt. This dirt is of no importance during a horizontal opening of the door because one can grip behind the handle without coming into contact with the upper and lower edge of the handle. If this handle would be utilized in the illustrated form for a tail gate, it would be absolutely necessary to grip the upper and lower edge, so that the operator would become dirty.

If this handle would be pivotal about a horizontal axis on the backside of a trunk lid, it would not offer a good handling possibility for the upward movement of the trunk lid or the tail gate. Further, the support legs in the known device are not constructed as handles, but only as guide parts and thus a difficult gripping behind the actual handle would be necessary.

The known arrangement cannot be used for opening of tail gates or trunk lids.

The basic purpose of the invention is to provide a device with which a dirt-free gripping of an operating handle in the area of the tail gate of a vehicle is possible, whereby the tail gate can both be lifted and also pulled downwardly without the hand coming into contact with the dirty automobile body.

The invention suggests a handle, the handle part of which, thus its area which is gripped by the hand, is completely moved back into an opening in the wall of the automobile body in the nonuse position, whereby in the moved-out position the handle part can be gripped from all sides, so that thus an upward or downward movement of the associated door, for example of the trunk lid, is possible. The handle part can be constructed as a swingable bar, which can be guided to the outside through a suitable opening in the wall of the automobile body, or it can be constructed as a pin movable parallel to itself (for example in connection with the locking cylinder of a lock), whereby furthermore the opening, through which the handle part is guided into the wall of the automobile body, can be closed off by an end plate, so that dirt penetration toward the inside of the automobile body is avoided.

The handle part can be combined with a lock. However, it is also possible for the locking mechanism to be independent from the handle part. As this is already known in motor vehicles, the handle part, independent from the operation of a lock, can be guided in a mechanical manner from a rest position into a ready position, if desired automatically. These mechanical devices can thereby also be operated from the inside of the vehicle. The handle part can hereby furthermore at the same time create the lock to the body of the automobile, so that the door is locked in the rest position of the handle part, however, the door or the tail gate can be opened in the ready position of the handle part. All of these measures can also be carried out in connection with a lock.

A problem which has existed for many years and in practice is again and again found to be undesirable is solved with the inventive suggestion, namely with the simplest means, which without great difficulties can also be realized in existing motor vehicles without that basic changes in the design of the body of the automobile are needed.

BRIEF DESCRIPTION OF THE DRAWINGS

Exemplary embodiments of the invention will be discussed hereinafter in connection with the drawings, in which.

DETAILED DESCRIPTION

Figure 1:
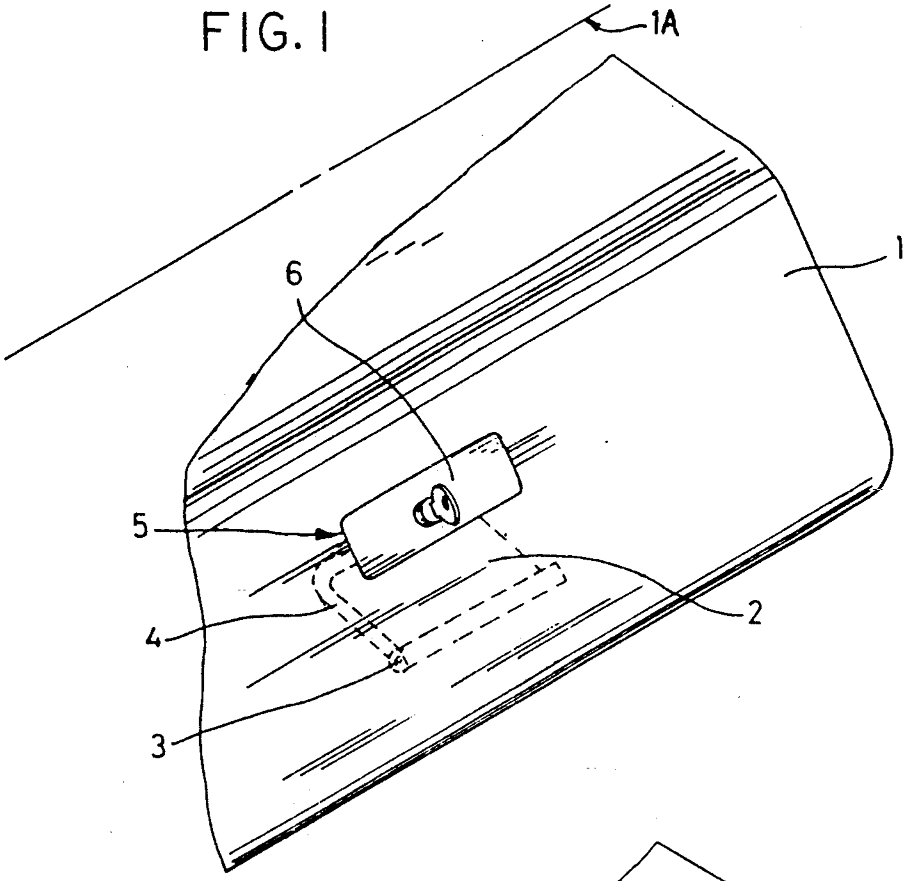
FIGS. 1 and 2 are diagrammatic illustrations of the inventive arrangement and FIGS. 3 and 4 are cross-sectional illustrations of an inventive device.

Reference numeral 1 in FIG. 1 identifies a wall of an automobile body, for example the rear portion of a tail gate into which an operating device 2 is inserted. The tail gate 1 is movable about the usual horizontal hinge axis schematically shown at 1A in FIG. 1. The operating device 2 consists substantially of a handle part 7,8, which in the embodiment according to FIGS. 1 and 2 consists of a pivotal L-shaped carrier 4, which is supported around a pivot bearing 3 at the backside of the wall 1 of the automobile body. An opening 15 exists in the wall 1, through which opening the handle part 7,8 of the pivotal carrier 4 can be swung outwardly. The opening 15 in the body of the automobile is covered by an end plate 5 provided on an outer end of the handle part 7,8, so that the inside of the body of the automobile cannot become dirty.

More specifically, the plate 5 is constructed flat in the exemplary embodiment illustrated in FIG. 1 and thus has an end surface 6, which ends flush with the outside of the automobile body. A surface 6A on the plate faces oppositely to the surface 6. The entire periphery of the surface 6A engages an outwardly facing surface 16, which is recessed inwardly within the trunk lid, to prevent dirt and the like from entering the opening 15.

Figure 2:
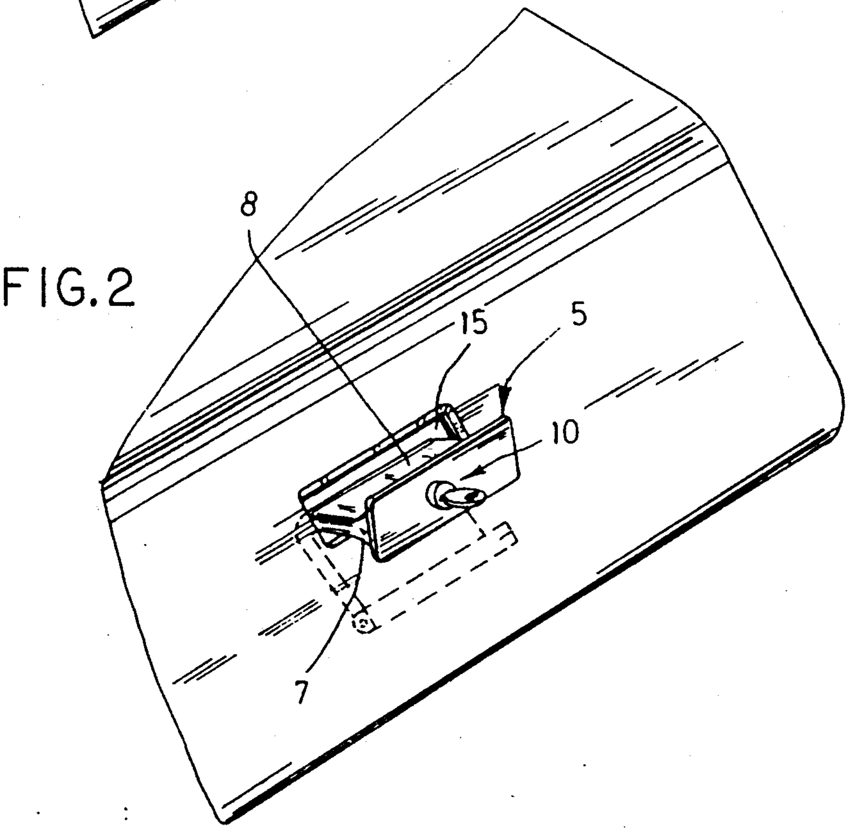

The operating device 2 is in the rest position in FIG. 1 and in the extended position in FIG. 2. The actual end plate 5 can additionally be equipped with a lock 10.

As can be seen from the illustration in FIGS. 1 and 2, the handle part 7,8 is movable into and out of the opening 15 and includes a pair of oppositely facing surfaces 7 and 8, each of which extends in planes which are transverse to the outside surface of the automobile body. The handle part 7,8, which is needed for operating or moving the wall 1 of the body of the automobile, that is, for example the lid of the trunk, is thus during the rest position, that is during the travel of the motor vehicle, protected by the end plate 5 against dirt, provided within the automobile body, so that when the handle part 7,8 is moved into the operating position, the handle surface areas 7 and 8 of the handle part 7,8 are available free of dirt. Thus, touching either one of the surface areas 7 or 8 to impart a force thereto will cause movement of the door about the hinge axis 1A.

Furthermore, the inventive device achieves an effective contact surface for a more effective and easier to handle operation of the wall 1 of the automobile body.

Figure 4:
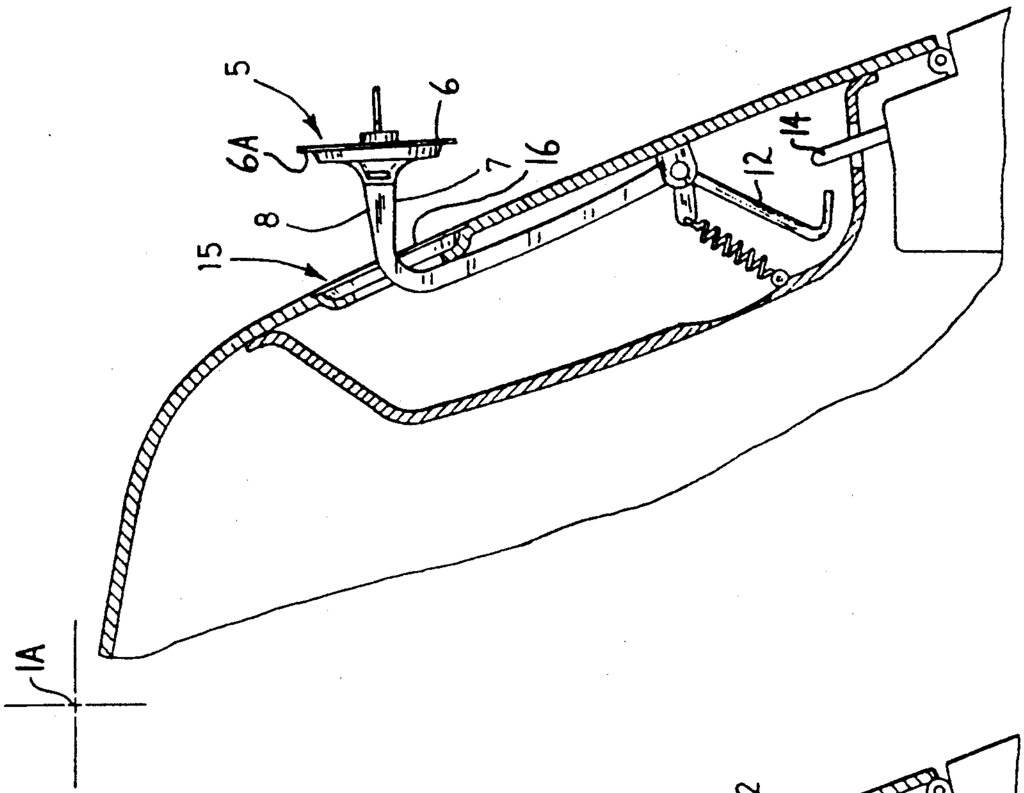
Figure 3:
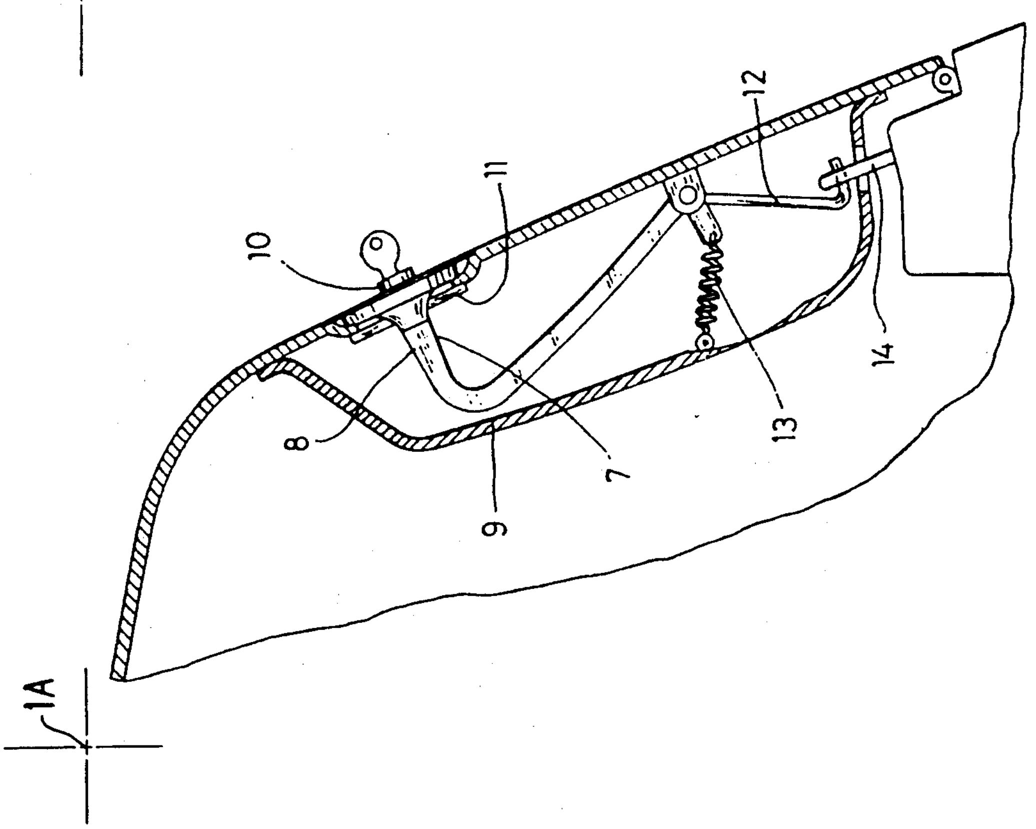

FIGS. 3 and 4 make clear that the inventive device 2 can be connected directly or indirectly to a lock 10 and/or is connected directly or indirectly with a locking mechanism of the tail gate to the automobile body.

Thus FIG. 3 shows an integrated lock 10 which, with its locking bars 11, protects the device 2 against an unintended opening. A locking of the tail gate to the automobile body is achieved by a locking lever 12 which engages a counter-piece 14 anchored on the automobile body and thus effects a locking of the tail gate. A spring 13, which is mounted at a suitable spot in a suitable manner and which, in FIGS. 3 and 4, is constructed as a pressure and snap spring which holds the operating device 2, that is the locking bar 12, in its respective end position. The handle parts 7,8 are here too countersunk and are additionally protected by a housing 9 toward the inside of the automobile body.

The embodiments of the invention in which an exclusive property or privilege is claimed are defined as follows:

1. A handle device for use in imparting a movement to an automobile trunk lid about a horizontal hinge axis for the purpose of opening and closing said trunk lid without necessitating a user's hand coming into contact with a portion of said handle device that is continuously exposed to an outside environment, comprising:

means defining an opening in a first outwardly facing surface of a panel of said trunk lid, said opening including a second outwardly facing surface recessed within said trunk lid from said first outwardly facing surface of said panel and encircling said opening;

a substantially L-shaped carrier;

a handle part on ne leg of said L-shaped carrier, said handle part having a pair of oppositely facing, substantially flat third and fourth surfaces, each of which extends in planes which are transverse to said first outwardly facing surface;

support means including a pivot bearing arranged on an inwardly facing surface of said panel for pivotally supporting an other leg of said L-shaped carrier for movement about an axis that is parallel to said hinge axis, said one leg being connected to said other leg at an end remote from said pivot bearing, said movement causing said handle part on said one leg and said third and fourth surfaces thereon to be moved into and out of said opening between first and second positions, said handle part, when in said first position, being received within said trunk lid and, when in said second position, only said one leg and said handle part with said third and fourth surfaces thereon extend through said opening so as to be exposed to the outside environment and accessible; and an end plate on an outer end of said handle part, said end plate having a fifth surface opposing said second outwardly facing surface within said opening, said end plate being oriented so that when said handle part is in said first position and received within said trunk lid, the entire periphery of said fifth surface on said end plate will engage said second outwardly facing surface to block the admittance of dirt and the like into said opening, and when said handle part is moved to said second position, the entire periphery of said fifth surface on said end plate will become spaced from said second outwardly facing surface so that both of said pair of oppositely facing third and fourth surfaces will be exposed to the outside environment and accessible and thereby provide a clean pair of said oppositely facing third and fourth surfaces to facilitate both an opening and a closing of said trunk lid by enabling said clean oppositely facing third and fourth surfaces to be touched to impart a force to a selected one of said pair of oppositely facing third and fourth surfaces to facilitate said opening and closing movements of said trunk lid about said horizontal hinge axis therefor.

2. The handle device according to claim 1, including locking means for locking said handle part in said first position.

3. A handle device for use in imparting a movement to an automobile trunk lid about a horizontal hinge axis for the purpose of opening and closing said trunk lid without necessitating a user's hand coming into contact with a portion of said handle device that is continuously exposed to an outside environment, comprising:

means defining an opening in a first outwardly facing surface of a panel of said trunk lid;

a substantially L-shaped carrier;

a handle part on one leg of said L-shaped carrier, said handle part having a pair of oppositely facing, substantially flat second and third surfaces, each of which extends in planes which are transverse to said first outwardly facing surface, said one leg being connected to an other leg of said L-shaped carrier at a location inside said trunk lid;

support means for movably supporting said other leg so that only said handle part with said second and third surfaces thereon is movable into and out of said opening and between first and second positions, said handle part, when in said first position, being received along with said other leg within said trunk lid and protected from the outside environment and, when in said second position, only said one leg and said handle part with said second and third surfaces thereon extend through said opening so that each of said oppositely facing second and third surfaces are exposed to the outside environment and accessible, said other leg of said L-shaped carrier always remaining inside said trunk lid; and surface means on an outer end of said one leg for facilitating a closing of said opening, said surface means being oriented so that when said handle part is in said first position, all of said surface means will be generally flush with said first outwardly facing surface with insufficient space being provided therebetween so as to close said opening and block the admittance of dirt and the like into said opening and to thereby prevent said second and third surfaces from becoming continuously exposed to the outside environment, and when said handle part is moved to said second position, said surface means becoming spaced from said first outwardly facing surface and both of said pair of oppositely facing second and third surfaces becoming exposed to the outside environment and accessible to provide a clean pair of said oppositely facing second and third surfaces to facilitate both an opening and a closing of said trunk lid by enabling said clean oppositely facing second and third surfaces to be touched to impart a force to a selected one of said pair of oppositely facing second and third surfaces to facilitate said opening and closing movements of said trunk lid about said horizontal hinge axis therefor.

4. The handle device according to claim 3, including locking means for locking said handle part in said first position.

5. The handle device according to claim 3, wherein said other leg of said L-shaped carrier is pivotally supported on a pivot bearing arranged on an inwardly facing surface of said panel.

6. The handle device according to claim 1, including first means for releasably latching said trunk lid in a closed position when said handle part is in said first position and said trunk lid is in said closed position, and second means for releasing said latching to facilitate a movement of said trunk lid from said closed position to an opened position.

7. The handle device according to claim 3, including first means for releasably latching said trunk lid in a closed position when said handle part is in said first position and said trunk lid is in said closed position, and second means for releasing said latching to facilitate a movement of said trunk lid from said closed position to an opened position.

* * * * *